United States Patent
Suenaga

(10) Patent No.: US 9,301,169 B2
(45) Date of Patent: Mar. 29, 2016

(54) FADING SIMULATOR AND FADING SIMULATION METHOD

(71) Applicant: Akihiko Suenaga, Atsugi (JP)

(72) Inventor: Akihiko Suenaga, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 173 days.

(21) Appl. No.: 14/173,468

(22) Filed: Feb. 5, 2014

(65) Prior Publication Data
US 2014/0242976 A1 Aug. 28, 2014

(30) Foreign Application Priority Data
Feb. 27, 2013 (JP) .................................. 2013-037376

(51) Int. Cl.
*H04M 1/00* (2006.01)
*H04W 24/06* (2009.01)

(52) U.S. Cl.
CPC ..................................... *H04W 24/06* (2013.01)

(58) Field of Classification Search
USPC ........ 455/423, 10, 67.11, 67.12, 67.13, 67.14
See application file for complete search history.

(56) References Cited

U.S. PATENT DOCUMENTS

| | | | | |
|---|---|---|---|---|
| 6,407,699 B1 * | 6/2002 | Yang | ........................ | G01S 19/21 342/357.59 |
| 6,590,874 B1 * | 7/2003 | Wang | ................... | H04B 7/2637 370/252 |
| 6,687,500 B1 * | 2/2004 | Causey | ................. | H04W 24/00 455/423 |
| 6,766,164 B1 * | 7/2004 | Funk | .................. | H04B 17/0085 379/21 |
| 2005/0152480 A1 * | 7/2005 | Chang | .................. | H04B 1/1027 375/343 |
| 2006/0114968 A1 * | 6/2006 | Nieto | ..................... | H03B 29/00 375/130 |
| 2007/0275663 A1 * | 11/2007 | Jung | ....................... | H04B 17/16 455/67.11 |
| 2011/0217937 A1 * | 9/2011 | Cook | ..................... | H04B 17/00 455/67.14 |
| 2012/0176919 A1 * | 7/2012 | Callender | ............. | H04W 24/08 370/252 |

FOREIGN PATENT DOCUMENTS

| | | |
|---|---|---|
| CN | 101521547 A | 9/2009 |
| JP | 04-123538 | 4/1992 |
| JP | 10-105525 | 4/1998 |
| JP | 2006-086992 | 3/2006 |

(Continued)

OTHER PUBLICATIONS

Office Action issued by the Japanese Patent Office in corresponding Japanese App. No. 2013-037376, mailed Jan. 13, 2015 (with translation).

(Continued)

*Primary Examiner* — Dai A Phuong
(74) *Attorney, Agent, or Firm* — Greer Burns & Crain Ltd.

(57) ABSTRACT

A fading simulator is provided, which includes a noise generator that generates an additive white Gaussian noise signal, receives a test signal to be input to a mobile communication terminal as a test target, and adds, to the test signal, a radio wave scattering effect, using the additive white Gaussian noise signal. The fading simulator is provided with setting means for setting for causing the noise generator to generate a same additive white Gaussian noise signal as the additive white Gaussian noise signal in the first test, when a first test is performed on the mobile communication terminal, and also for setting for causing the noise generator to generate the additive white Gaussian noise signal of the predetermined level when a second test for re-simulating the first test is performed after the first test.

12 Claims, 14 Drawing Sheets

(56) References Cited

FOREIGN PATENT DOCUMENTS

| | | |
|---|---|---|
| JP | 2007-028298 | 2/2007 |
| JP | 2012-195895 | 10/2012 |

OTHER PUBLICATIONS

Office Action issued by the Chinese Patent Office on Sep. 2, 2015 mailed Jan. 13, 2015 (with translation).

* cited by examiner

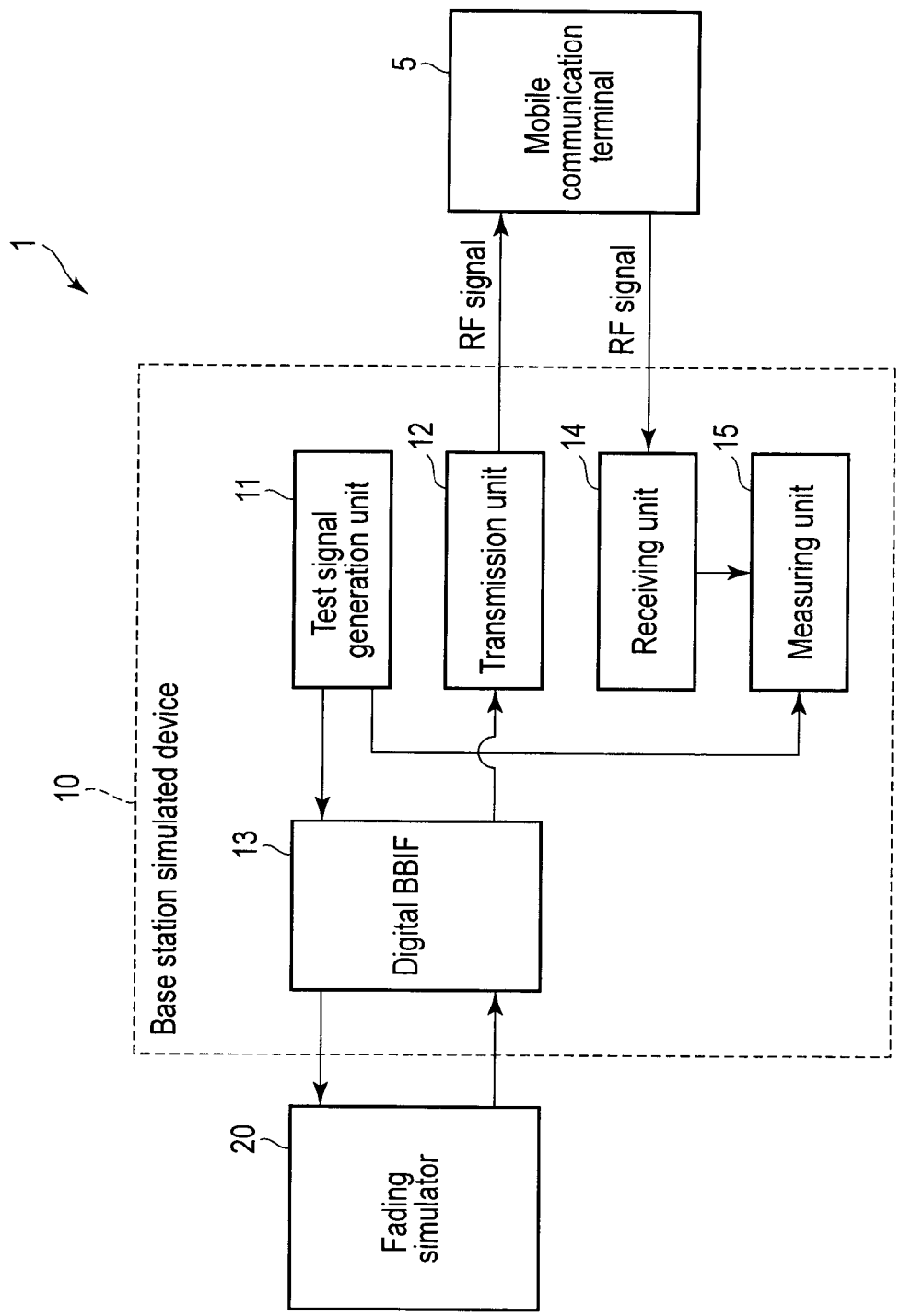
F I G. 1

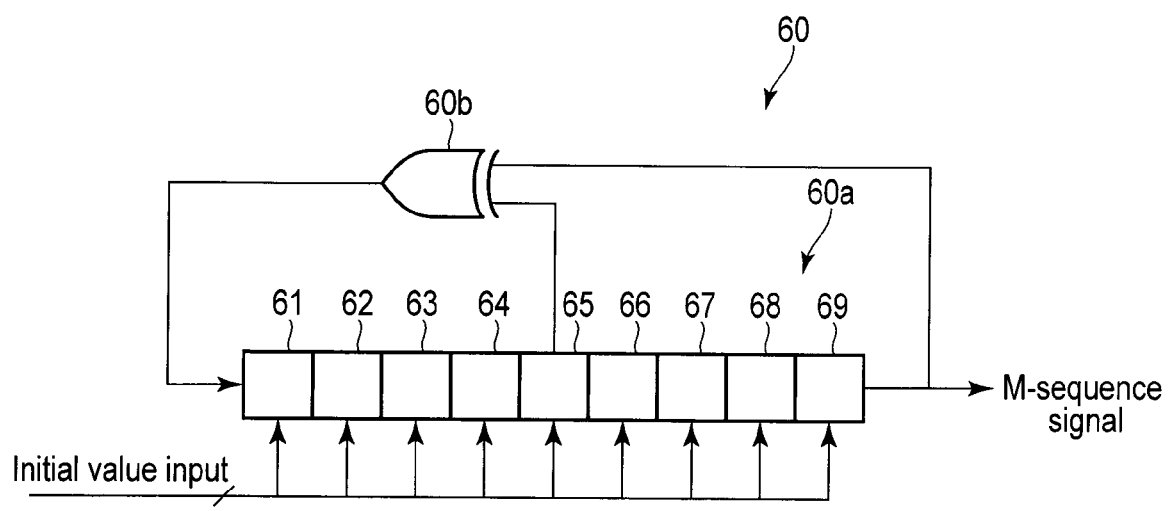
F I G. 3

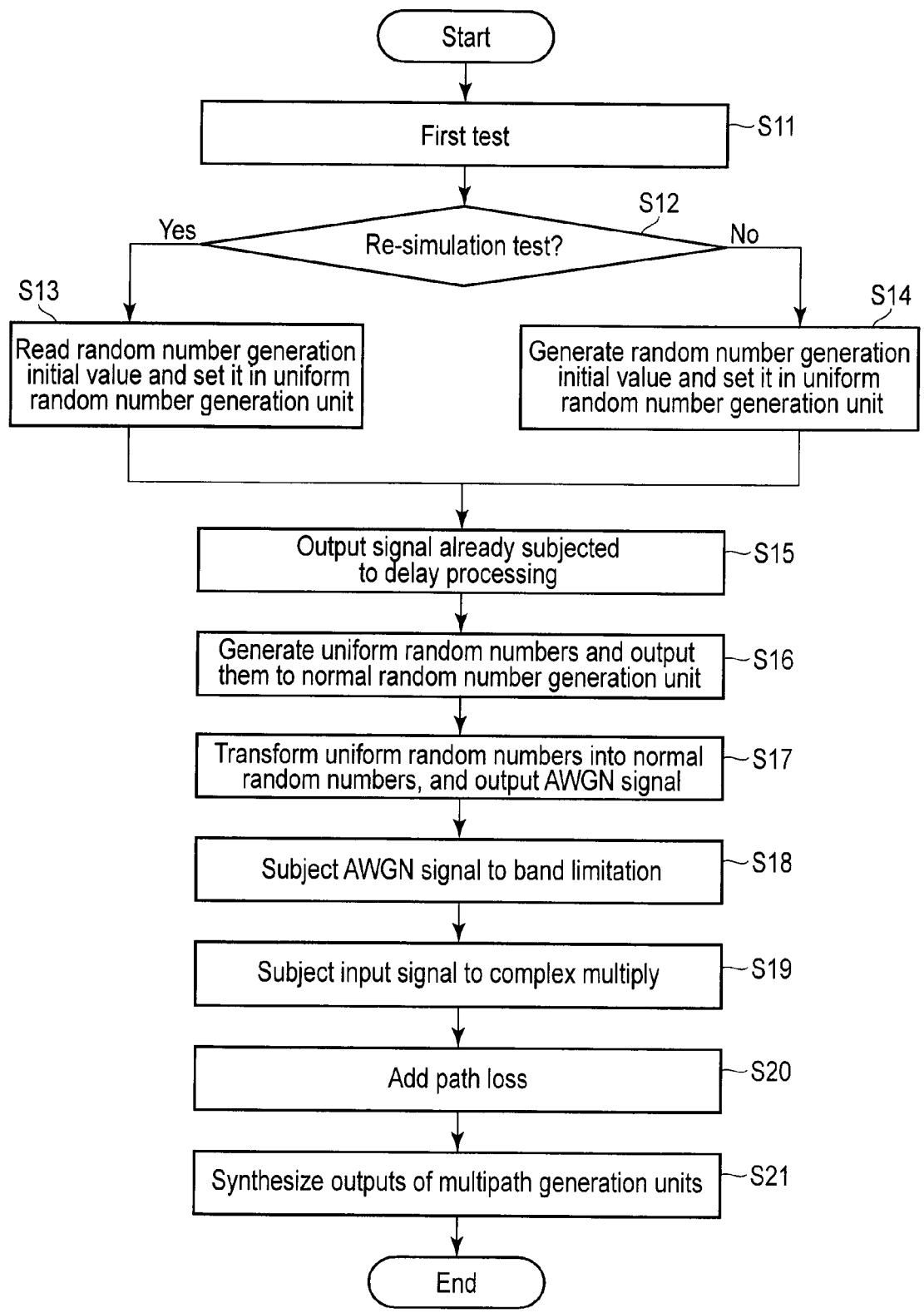
F I G. 4

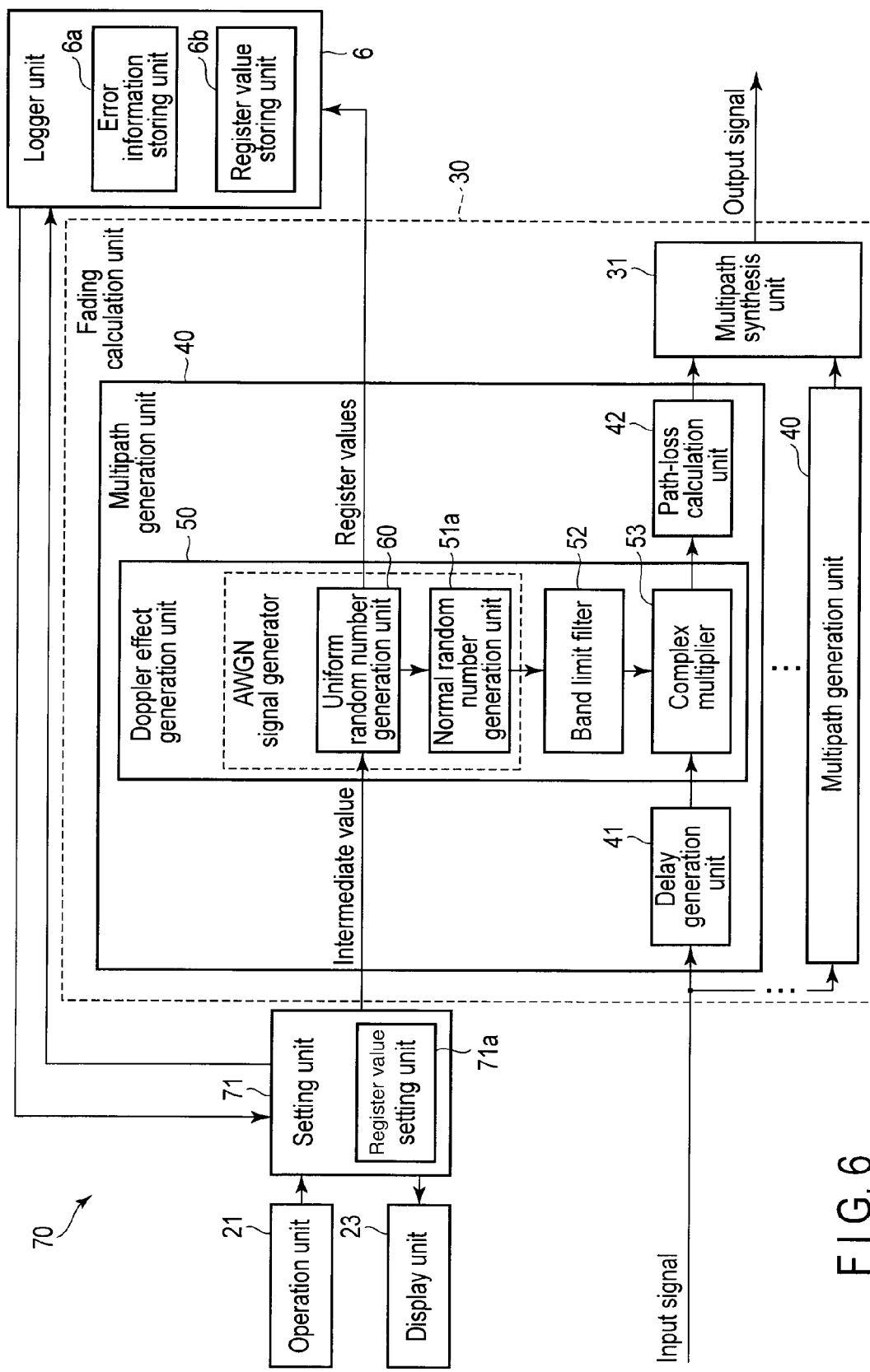
F I G. 6

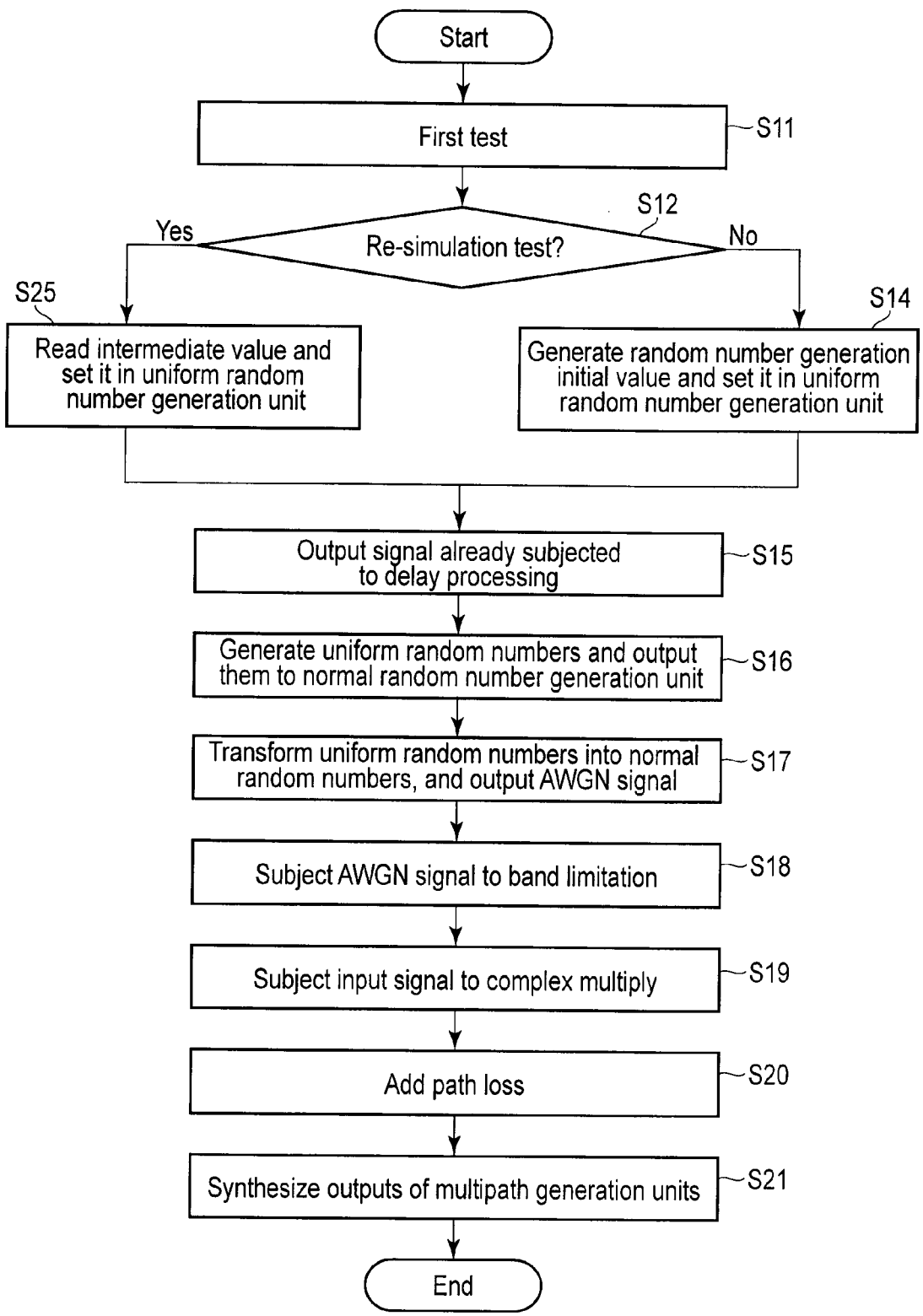
F I G. 8

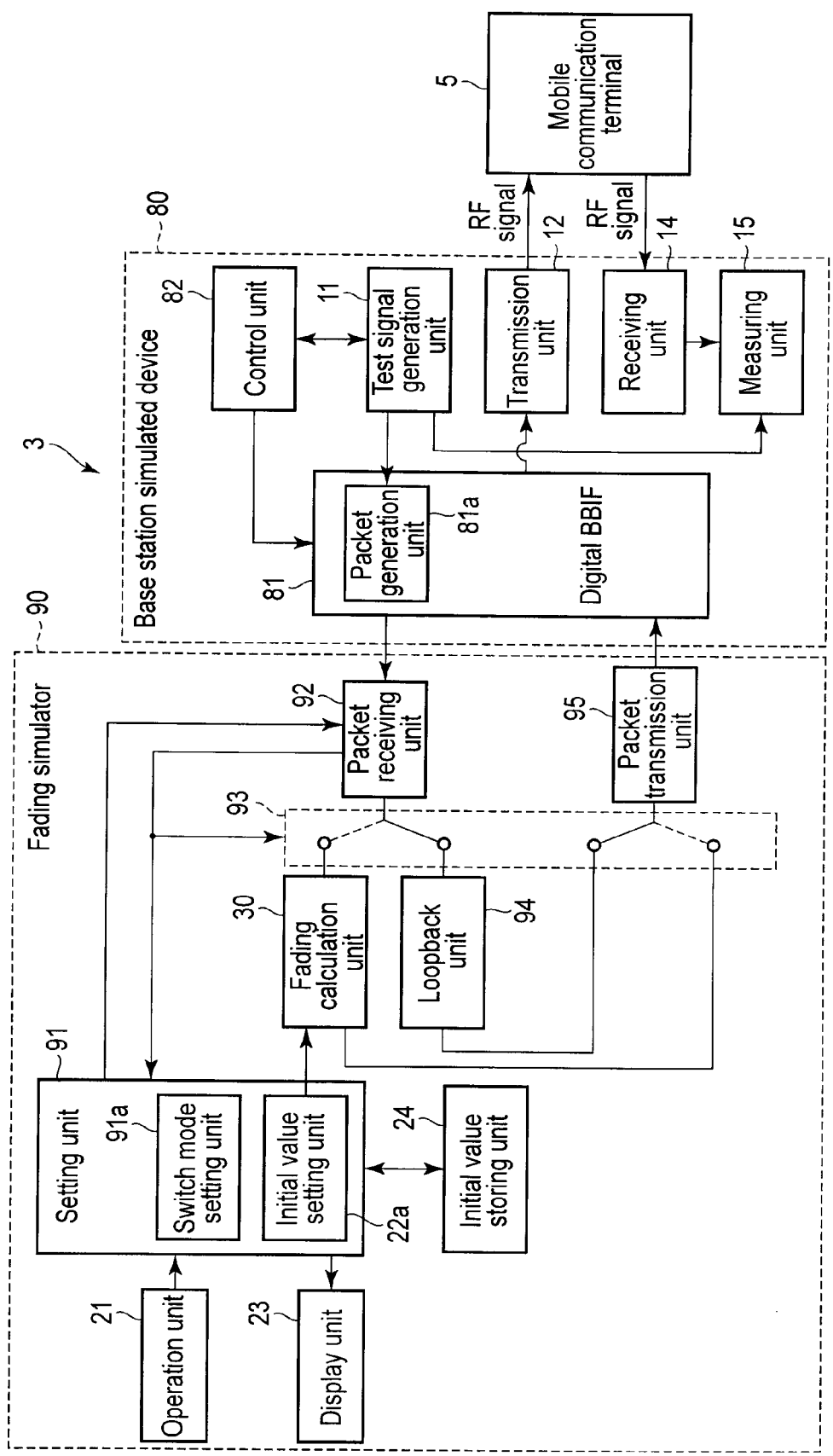
F I G. 9

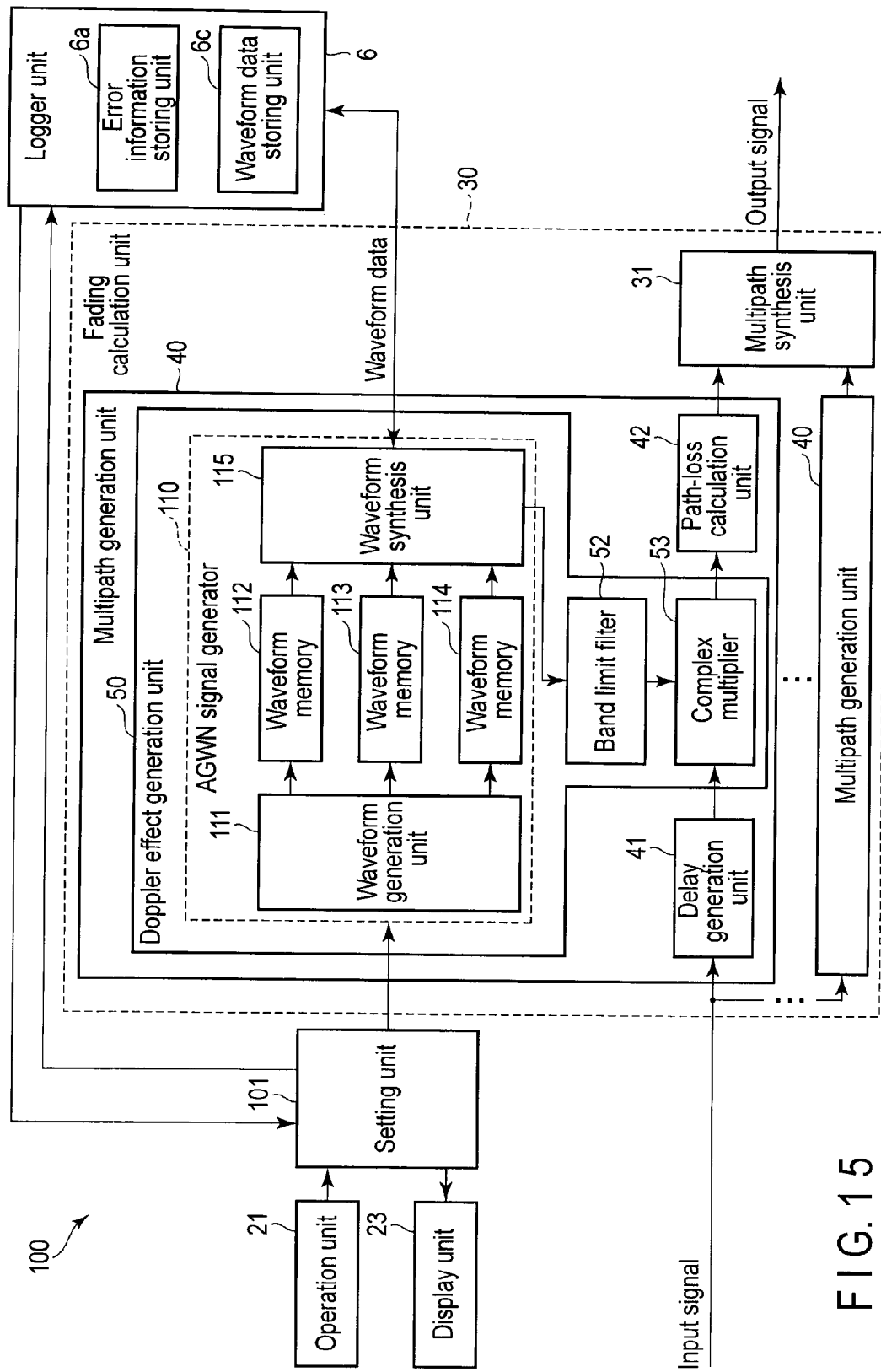
F I G. 15

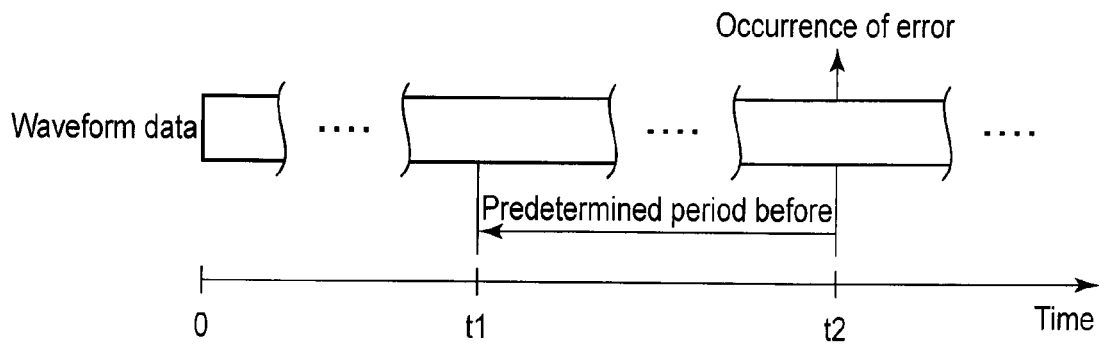
F I G. 16
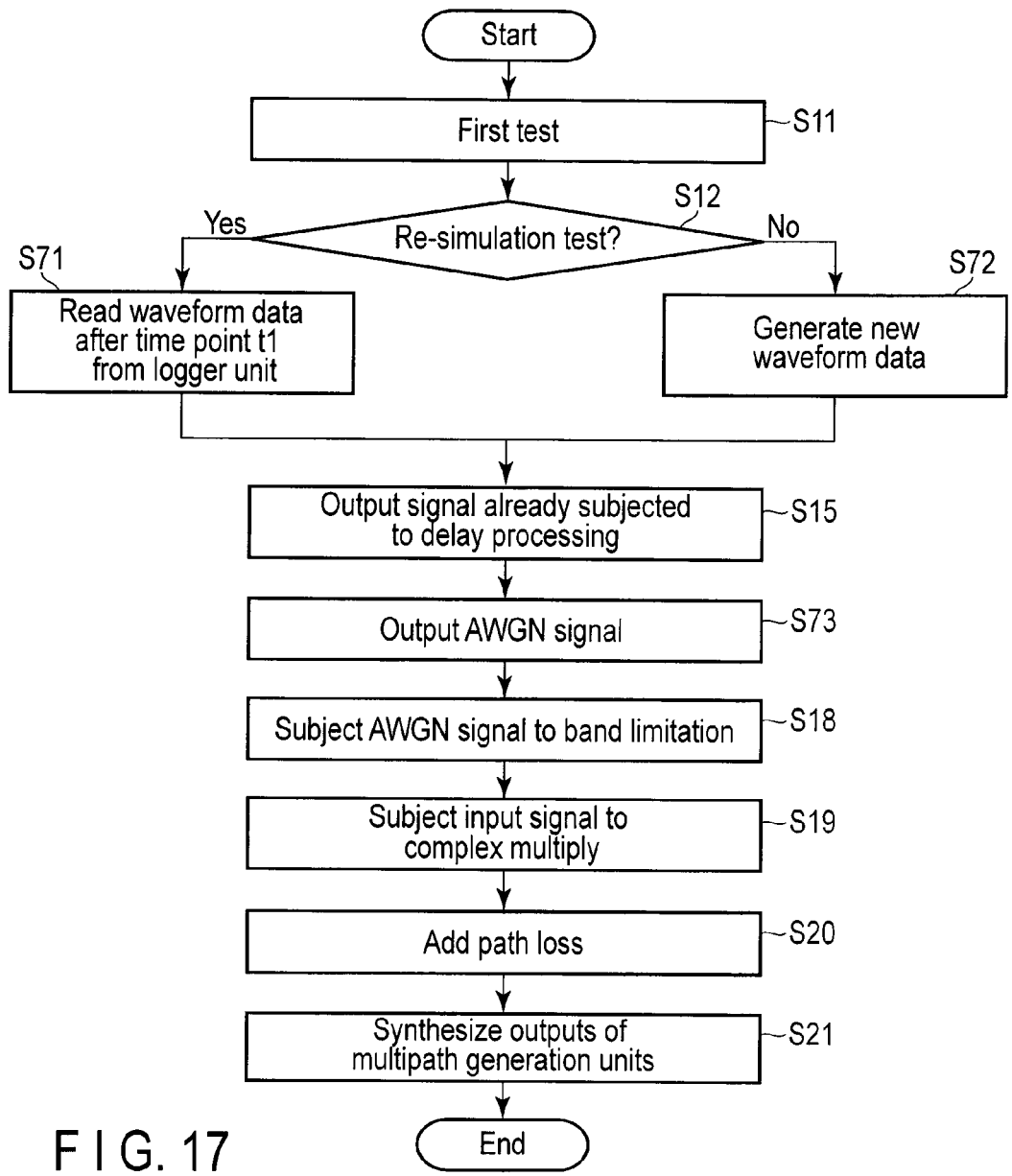
F I G. 17

FADING SIMULATOR AND FADING SIMULATION METHOD

CROSS-REFERENCE TO RELATED APPLICATIONS

This application is based upon and claims the benefit of priority from prior Japanese Patent Application No. 2013-037376, filed Feb. 27, 2013, the entire contents of which are incorporated herein by reference.

BACKGROUND OF THE INVENTION

1. Field of the Invention

Embodiments described herein relate generally to a fading simulator and a fading simulation method, and more particularly to a fading simulator and a fading simulation method for simulating a radio wave propagation environment associated with, for example, mobile communication terminals, such as cellular phones and mobile terminals.

2. Description of the Related Art

Mobile communication terminals, such as cellular phones, have been rapidly developed in recent years. The radio wave emitted from a base station to a mobile communication terminal is multiplexed by reflection, scattering or diffraction due to land features and the feature of structural objects, and the amplitude and phase of the radio wave randomly vary between different localities. In mobile communication terminals, when receiving radio wave from a base station while moving through a propagation path, fading will occur due to multipath propagation. Communications by the mobile communication terminals are significantly influenced by the fading. Accordingly, to evaluate the communication performance of mobile communication terminals, a device called a fading simulator, which is configured to simulate a radio wave propagation environment, is utilized, as well as a base station simulating device for simulating a base station. Jpn. Pat. Appln. KOKAI Publication No. 2012-195895, for example, discloses a fading simulator.

In conventional fading simulators, a statistical model is usually implemented to estimate the influence of the Doppler effect caused by the movement of a mobile communication terminal. In general, as a statistical model feature, it is desired that no periodicity or reproducibility will occur for a long period of time. In contrast, in practical use of fading simulators, it is desired that the statistical model feature be reliably reproduced or simulated when fading simulation is repeated under the same fading conditions.

However, in the conventional fading simulators, since the reproducibility of the statistical model is not considered, good reproducibility cannot be obtained in a mobile communication terminal test when fading simulation is repeated under the same fading conditions.

An object of the present invention is to provide a fading simulator and a fading simulation method capable of enhancing the reproducibility of a mobile communication terminal test even when fading simulation is repeated under the same fading conditions.

BRIEF SUMMARY OF THE INVENTION

The fading simulator (20, 70, 90, 100) recited in claim 1 of the invention includes a noise generation unit (51) that generates an additive white Gaussian noise signal, and is configured to receive a test signal to be input to a mobile communication terminal (5) as a test target, and to add, to the test signal, a radio wave scattering effect, using the additive white Gaussian noise signal, the fading simulator comprising: setting means (22, 71, 91, 101) for setting for causing the noise generation unit to generate an additive white Gaussian noise signal of a predetermined level, when a first test is performed on the mobile communication terminal, the setting means also setting for causing the noise generation unit to generate the same additive white Gaussian noise signal as the additive white Gaussian noise signal in the first test, when a second test that re-simulates the first test is performed after the first test.

In the structure of the fading simulator of claim 1, when a re-simulation test is performed, the setting means performs, on the noise generation unit, the setting for generating the same additive white Gaussian noise signal as in the original test, which enhances the reproducibility of a mobile communication terminal test even when fading simulation is repeated under the same fading conditions.

In the fading simulator recited in claim 2 of the invention, the noise generation unit comprises: uniform random number generation means (60) for sequentially generating uniform random numbers, the uniform random numbers being determined uniquely in accordance with clock signals when predetermined data is set; and normal random number transform means (51a) for transforming, into normal random numbers, the uniform random numbers generated by the uniform random number generation means. Further, the setting means comprises data setting means (22a) for setting the predetermined data in the uniform random number generation means, the data setting means setting the predetermined data, set in the first test, in the uniform random number generation means when the second test is performed.

In the structure of the fading simulator of claim 2, the uniform random number generation means sequentially generates uniform random numbers which are determined uniquely in accordance with clock signals when predetermined data is set, and the data setting means sets predetermined data in the uniform random number generation means, the predetermined data being set in a first test when a re-simulation test for simulating the first test is performed after the first test is performed on the mobile communication terminal. Accordingly, the reproducibility of a mobile communication terminal test can be enhanced even when fading simulation is repeated under the same fading conditions.

In the fading simulator recited in claim 3 of the invention, the uniform random number generation means is a pseudo noise code generation unit including a plurality of shift registers (61 to 69), and generates each of the uniform random numbers by changing register values in the shift registers in accordance with a corresponding one of the clock signals.

In the structure of the fading simulator of claim 3, the uniform random number generation means can be formed of a pseudo noise code generation unit including a plurality of shift registers.

In the fading simulator recited in claim 4 of the invention, a log of the register values is made in the first test; the second test is performed to re-simulate an operation after a second time point that is a predetermined time period before a first time point at which an error occurred at the mobile communication terminal during execution of the first test; and the setting means further comprises register value setting means (71a) for setting the register values based on a log at the second time point when the second test is performed.

By virtue of the structure of claim 4, the fading simulator can perform a re-simulation test based on the register values set by the register value setting means.

The fading simulator recited in claim 5 of the invention further comprises: packet receiving means (92) connected to a base station simulated device (80) that simulates an operation of a base station to transmit the test signal to the mobile communication terminal, the packet receiving means being used to receive, from the base station simulated device, a packet containing the test signal to be input to the mobile communication terminal, and control information used to control timing of adding the radio wave scattering effect to the test signal; route switching means (93) for performing switching between a route for adding the radio wave scattering effect to the test signal, and a route for not adding radio wave scattering effect to the test signal; and packet transmission means (95) for transmitting, to the base station simulated device, a packet containing one of a test signal with the radio wave scattering effect and a test signal without the radio wave scattering effect.

By virtue of this structure, the fading simulator of claim 5 can add the radio wave scattering effect to the test signal even during packet transmission, based on control information used to control timing of adding the radio wave scattering effect to the test signal.

The fading simulator recited in claim 6 of the invention further comprises: waveform data generation means (111) for generating a plurality of waveform data that differ from each other in period; and waveform data synthesis means (115) for synthesizing the waveform data and outputting synthesized waveform data as the additive white Gaussian noise signal. In this structure, a log of the waveform data output from the waveform data synthesis means is made, the waveform data synthesis means is permitted to read the log and output the additive white Gaussian noise signal based on the log; and the setting means performs setting for outputting the additive white Gaussian noise signal based on the log, made in the first test, when the second test is performed.

By virtue of this structure, the fading simulator of claim 6 can generate and synthesize a plurality of waveform data, and can perform a re-simulation test based on waveform data with a longer noise signal period.

In the fading simulator recited in claim 7 of the invention, the second test is performed to re-simulate an operation after a second time point that is a predetermined time period before a first time point at which an error occurred at the mobile communication terminal during execution of the first test; and the setting means performs setting for outputting the additive white Gaussian noise signal based on a log made after the second time point, when the second test is performed.

By virtue of this structure, the fading simulator of claim 7 can perform a re-simulation test that is set to start from a time point a predetermined time period earlier than the time point at which an error occurred.

The fading simulation method recited in claim 8 of the invention includes noise generation step for generating an additive white Gaussian noise signal, and step for receiving a test signal to be input to a mobile communication terminal (5) as a test target, and for adding, to the test signal, a radio wave scattering effect, using the additive white Gaussian noise signal, comprising: first setting step for performing setting for generating an additive white Gaussian noise signal of a predetermined level in the noise generation step, when a first test is performed on the mobile communication terminal; and second setting step for performing setting for generating the same additive white Gaussian noise signal as the additive white Gaussian noise signal in the first test, when a second test that re-simulates the first test is performed after the first test is performed.

In the fading simulation method of claim 8, when a re-simulation test is performed, the setting for generating the same additive white Gaussian noise signal as in the original test, which enhances the reproducibility of a mobile communication terminal test even when fading simulation is repeated under the same fading conditions.

As described above, the invention can provide a fading simulator and a fading simulation method capable of enhancing the reproducibility of a mobile communication terminal test even when fading simulation is repeated under the same fading conditions.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the structure of a mobile communication terminal testing system according to a first embodiment of the invention;

FIG. 3 shows a uniform random number generation unit incorporated in the fading simulator of the first embodiment;

FIG. 4 is a flowchart for explaining a process in the fading simulator of the first embodiment;

FIG. 6 is a block diagram showing the structure of a fading simulator incorporated in the mobile communication terminal testing system of the second embodiment;

FIG. 8 is a flowchart for explaining a process in the fading simulator of the second embodiment;

FIG. 9 is a block diagram showing the structure of a mobile communication terminal testing system according to a third embodiment of the invention;

FIG. 15 is a block diagram showing the structure of a fading simulator according to a fourth embodiment of the invention;

FIG. 16 schematically shows waveform data stored in a logger section incorporated in the fading simulator of the fourth embodiment; and FIG. 17 is a flowchart for explaining a process in the fading simulator of the fourth embodiment.

DETAILED DESCRIPTION OF THE INVENTION

Figure 2:
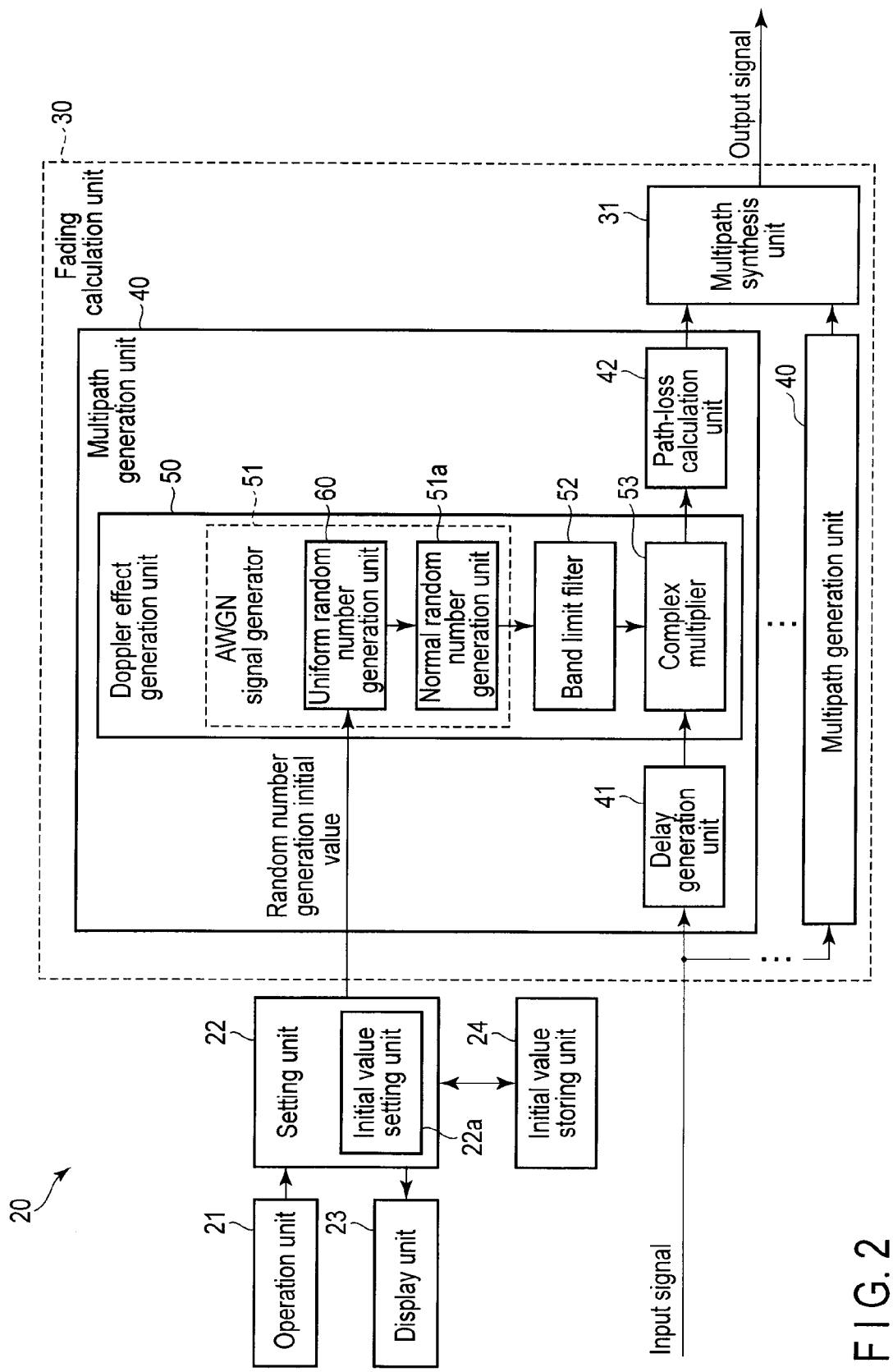
FIG. 2 is a block diagram showing the structure of a fading simulator incorporated in the mobile communication terminal testing system of the first embodiment.

Various embodiments will be described hereinafter with reference to the accompanying drawings.

First Embodiment

Firstly, a description will be given of the configuration of a mobile communication terminal testing system according to a first embodiment of the invention.

As shown in FIG. 1, the mobile communication terminal testing system 1 of the first embodiment for testing a mobile communication terminal is configured to evaluate the reception performance of a mobile communication terminal 5 while the terminal is moving, and comprises a base station simulated device 10 corresponding to a base station for simulation, and a fading simulator 20 for simulating a radio wave propagation environment associated with a mobile communication terminal, such as a cellular phone and a mobile terminal.

The base station simulated device 10 comprises a test signal generation unit 11 configured to generate a test signal, a transmitter 12 configured to transmit an RF signal to a mobile communication terminal, a digital baseband interface (digital BBIF) 13, a receiver 14 configured to receive the RF signal from the mobile communication terminal, and a measuring unit 15. The base station simulated device 10 is connected to the mobile communication terminal 5 via, for example, a coaxial cable.

The test signal generation unit 11 is configured to store or generate a digital baseband signal, and output it to a fading simulator 20 via the digital BBIF 13.

The transmitter 12 is configured to receive a baseband signal provided with a fading effect by the fading simulator 20, up-convert the signal into a predetermined RF (radio frequency) signal, and output the resultant signal to the mobile communication terminal 5.

The digital BBIF 13 is configured to input/output digital signals between the base station simulated device 10 and the fading simulator 20.

The receiver 14 is configured to receive a signal from the mobile communication terminal 5 and output it to the measuring unit 15.

The measuring unit 15 is configured to measure, for example, a throughput and a bit error rate (BER) based on the signal received from the mobile communication terminal 5, and display the measurement result on a display unit (not shown).

FIG. 2 is a block diagram showing the structure of the fading simulator 20 in detail. As shown in FIG. 2, the fading simulator 20 comprises an operation unit 21 to be operated by an operator (tester), a setting unit 22 configured to set, for example, an initial value in accordance with an input from the operation unit 21, a display unit 23 configured to display information, such as setting information in the setting unit 22, an initial value storing unit 24 configured to store various initial values and supply them to the setting unit 22 in accordance with an input from the operation unit 21, and a fading calculation unit 30 configured to perform fading operation based on the setting information in the setting unit 22.

The fading simulator 20 is configured to operate in accordance with the setting based on various setting parameters (setting parameters, such as, delay, decay and scatter parameters) set by the tester to add various fading effects to test signals, and to output signals with various fading effects to the mobile communication terminal 5 via the base station simulated device 10.

The operation unit 21 is operated by an operator (tester) to input each test condition for testing the mobile communication terminal 5, to perform setting for determining whether a re-simulation test should be performed, or to perform setting of the display content of the display unit 23, and is formed of, for example, an input device, such as a keyboard, a dial or a mouse, a control circuit and/or software for controlling the input device.

The setting unit 22 is configured to perform setting of each unit based on the test conditions input by tester's operation of the operation unit 21.

In particular, the setting unit 22 includes an initial value setting unit 22a that sets a value firstly used when a uniform random number generation unit 60, described later, generates a random number. herein-after the value is referred to as a "random number generating initial value".

When it is set through the operation unit 21 that no re-simulation test is to be performed, the initial value setting unit 22a is configured to set, in the uniform random number generation unit 60, a predetermined random number generating initial value (fixed value) or an automatically generated random number generating initial value, or the random number generating initial value input by the tester by operating the operation unit 21, and to store the set random number generating initial value in the initial value storing unit 24. In contrast, when it is set through the operation unit 21 that a re-simulation test is to be performed, the initial value setting unit 22a is configured to read a random number generating initial value from the initial value storing unit 24 to set the same in the uniform random number generation unit 60. Thus, the initial value setting unit 22a forms data setting means for setting data.

The display unit 23 is configured to display the information set by tester's operation of the operation unit 21, and to also display the operation state of the fading test.

The initial value storing unit 24 is configured to store the random number generating initial value set by the initial value setting unit 22a. The random number generating initial value is the data, which is read by the initial value setting unit 22a and set in the uniform random number generation unit 60 before the start of the re-simulation test, and corresponds to predetermined data.

The fading calculation unit 30 comprises a plurality of multipath generation units 40 configured to generate multipath signals, and a multipath synthesizer 31 configured to synthesize signals output from the generation units 40, as is shown in FIG. 2. Each of the multipath generation units 40 is configured to generate a multipath signal for simulating a path in which fading occurs. Actual fading can be simulated by finally synthesizing, in the multipath synthesizer 31, signals (multipath signals) output from the multipath generation units 40.

To simulate fading, each of the multipath generation units 40 comprises a delay generation unit 41 configured to generate a delay corresponding to a radio wave propagation distance difference, a Doppler effect generation unit 50 configured to generate the Doppler effect for adding a radio wave scattering effect, and a path-loss calculation unit 42 configured to generate a path-loss indicating the level reduction caused by radio wave propagation distance and reflection.

The delay generation unit 41 is configured to perform delay processing on a test signal supplied from the digital BBIF 13, if a parameter associated with delay, which is included in the parameters set by the setting unit 22, is set.

The Doppler effect generation unit 50 comprises an AWGN signal generator 51 configured to generate an additive white Gaussian noise (AWGN) signal, a band limit filter 52 configured to limit the band of the AWGN signal output from the AWGN signal generator 51, and an complex multiplier 53 configured to perform complex multiplication on the test signal with a delay added by the delay generation unit 41. The complex multiplier 53 is configured to complex-multiply the AWGN signal and the test signal to be input to the mobile communication terminal 5, to thereby add an effect of radio wave scattering.

Since AWGN is called additive white Gaussian noise, addition white Gaussian noise, summing white Gaussian noise, etc., when AWGN is referred to, it is supposed to include additive white Gaussian noise, addition white Gaussian noise, summing white Gaussian noise, etc. The AWGN signal generator 51 comprises the aforementioned uniform random number generation unit 60 for generating uniform random numbers, and a normal random number generation unit 51a for generating normal random numbers, and is configured to generate AWGN signals. The AWGN signal generator 51 corresponds to a noise generation unit.

The uniform random number generation unit 60 is configured to sequentially generate uniform random numbers uniquely determined in accordance with a clock signal after a random number generating initial value is set. The uniform random number generation unit 60 corresponds to uniform random number generation means.

The normal random number generation unit 51a is configured to generate normal random numbers of the normal Gaussian distribution from uniform random numbers of a uniform distribution, based on, for example, the Box-Muller's method. The normal random number generation unit 51a corresponds to normal random number transform means.

The band limit filter 52 is configured to apply a band limit to the normal random numbers output by the normal random number generation unit 51a.

The complex multiplier 53 is configured to complex-multiply a test signal output from the delay generation unit 41 and a signal output from the band limit filter 52.

The path-loss calculation unit 42 is configured to be set to a parameter associated with a path loss (attenuation) and included in the parameters set by the setting unit 22, and to add the path loss to the test signal output from the complex multiplier 53.

The multipath synthesizer 31 is configured to synthesize the signals output from the multipath generation units 40, and output the resultant signal to the digital BBIF 13.

The structure of the uniform random number generation unit 60 will now be described. The uniform random number generation unit 60 is formed of, for example, such a pseudorandom noise (PN) code generation unit as shown in FIG. 3.

As shown in FIG. 3, the uniform random number generation unit 60 formed of the PN code generation unit comprises a shift register 60a and an exclusive OR circuit 60b, and is configured to output a so-called maximum length sequence (M-sequence) signal. The shift register 60a includes, for example, 9-stage shift registers 61 to 69, and is configured to shift stages one by one in accordance with a clock signal. For the shift registers 61 to 69, a nine-bit random number generation initial value is set by the initial value setting unit 22a.

The exclusive OR circuit 60b is configured to extract the output of the ninth-stage shift register 69 and that of, for example, the fifth-stage shift register 65, and to output the exclusive OR of these two outputs to the first-stage shift register 61.

Since as described above, the uniform random number generation unit 60 comprises the nine-bit shift register 60a, the period of the generated M-sequence signals becomes $2^9-1$ (=511). Namely, stochastically, the uniform random number generation unit 60 generates an M-sequence signal of the same value as the firstly generated M-sequence signal after it generates 511 M-sequence signals. Thus, the uniform random number generation unit 60 can generate M-sequence signals of different uniform pseudo random number values within the period (that is, none of the values coincides with any other value within the period).

After a certain random number initial value is set, the uniform random number generation unit 60 sequentially generates M-sequence signals in accordance with a clock signal input thereto. The uniform random number generation unit 60 is characterized in that after it is operated using the same random number generation initial value, it outputs M-sequence signals in the same order. Accordingly, if the same random number generation initial value is used in a plurality of tests, the Doppler effect generation unit 50 can impart the same Doppler effect to a test signal in each test, thereby enabling the same Doppler effect imparting test to be reproduced.

In the fading simulator 20, a statistical model is applied only to the Doppler effect generation unit 50. Therefore, the fading simulator 20 can always perform a reproducible fading simulation on each test signal by imparting reproducibility to the Doppler effect generation unit 50.

Referring then to the flowchart of FIG. 4, a description will be given of the operation of the fading simulator 20. It is assumed here that processing for line connection between the base station simulated device 10 and the mobile communication terminal 5 has finished, and the operation performed after the fading simulator 20 performs a first test (step S11) on the mobile communication terminal 5 will be described. It is also assumed that the random number generation initial value used in the first test is stored in the initial value storing unit 24.

After the first test (step S11) finishes, the setting unit 22 determines whether there is a request for a re-simulation test (step S12). If the setting unit 22 determines that there is a request for a re-simulation test, it reads the random number generation initial value from the initial value storing unit 24, and the initial value setting unit 22a of the setting unit 22 sets the data in the uniform random number generation unit 60 (step S13).

In contrast, if the setting unit 22 determines that there is no request for a re-simulation test, it generates a new random number generation initial value, and the initial value setting unit 22a of the setting unit 22 sets the new value in the uniform random number generation unit 60 (step S14).

The delay generation unit 41 generates a delay corresponding to the radio wave propagation distance difference and applies it to a test signal, based on the test condition set in the setting unit 22, and outputs the resultant signal to the Doppler effect generation unit 50 (step S15).

In the Doppler effect generation unit 50, the uniform random number generation unit 60 generates uniform random numbers per each clock signal based on the random number generation initial value set by the initial value setting unit 22a (step S16), and outputs them to the normal random number generation unit 51a. If the random number generation initial value set by the initial value setting unit 22a in the uniform random number generation unit 60 is the value read from the initial value storing unit 24 (in the case of going through step S13), the uniform random numbers generated by the uniform random number generation unit 60 are identical in a time-series order to those used in the first test. In contrast, if the initial value setting unit 22a has newly generated a random number generation initial value (in the case of going through step S14), and therefore if a random number generation initial value differing from that stored in the initial value storing unit 24 is set in the uniform random number generation unit 60, the uniform random numbers generated by the uniform random number generation unit 60 differ from those used in the first test.

The normal random number generation unit 51a receives uniform random numbers from the uniform random number generation unit 60, and supplies the band limit filter 52 with the AWGN signal obtained by transforming the uniform random numbers into normal random numbers (step S17).

The band limit filter 52 limits the band of the AWGN signal received from the normal random number generation unit 51a, and outputs the resultant signal to the complex multiplier 53 (step S18).

The complex multiplier 53 performs complex multiplication on the test signal output from the delay generation unit 41, and outputs the resultant signal to the path-loss calculation unit 42 (step S19).

The path-loss calculation unit 42 adds a path loss to the signal output from the complex multiplication 53 (step S20), and outputs the resultant signal to the multipath synthesizer 31.

The multipath synthesizer 31 synthesizes the output signals of the multipath generation units 40 and outputs the resultant signal to the digital BBIF 13 (step S21).

As described above, in the fading simulator 20 of the first embodiment, the uniform random number generation unit 60 generates uniform random numbers uniquely determined from initial data and sequentially generated in accordance with a clock signal, and the initial value setting unit 22a performs a test on the mobile communication terminal 5, and sets, in the uniform random number generation unit 60, the data set in the test, when a re-simulation test is performed for reproducing the first-mentioned test. Accordingly, the reproducibility of the test of the mobile communication terminal can be enhanced even when fading simulation is repeated under the same fading conditions.

Second Embodiment

Firstly, a description will be given of the configuration of a mobile communication terminal testing system 2 according to a second embodiment of the invention.

Figure 5:
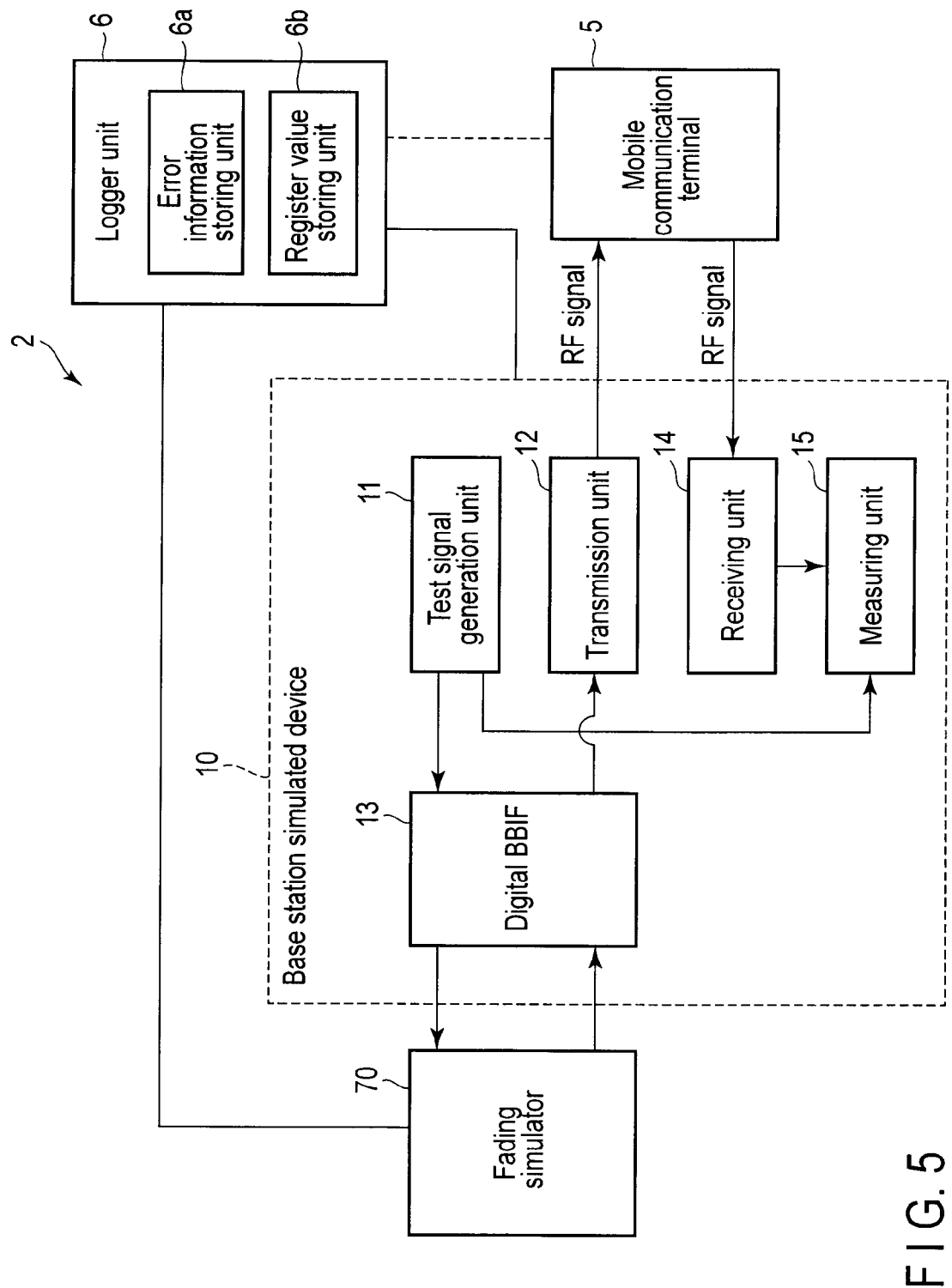
FIG. 5 is a block diagram showing the structure of a mobile communication terminal testing system according to a second embodiment of the invention.

As shown in FIG. 5, the mobile communication terminal testing system 2 of the second embodiment comprises a logger unit 6, a base station simulated device 10, and a fading simulator 70. Since the base station simulated device 10 has the same configuration as that of the first embodiment (see FIG. 1), the elements of the device 10 are denoted by corresponding reference numbers, and no detailed description will be given thereof.

The fading simulator 70 is constructed as shown in FIG. 6. Namely, the fading simulator 70 comprises a setting unit 71. The setting unit 71 comprises a register value setting unit 71a. The register value setting unit 71a is configured to supply the uniform random number generation unit 60 with intermediate values associated with random numbers, described later. The register value setting unit 71a corresponds to register value setting means. In the fading simulator 70, the initial value storing unit 24 incorporated in the fading simulator 20 (see FIG. 2) of the first embodiment can be omitted.

The uniform random number generation unit 60 is configured to output, to the logger unit 6, the data of, for example, each of the nine registers 61 to 69 shown in FIG. 3 in accordance with a clock signal (not shown).

The logger unit 6 comprises an error information storing unit 6a for storing error information, and a register value storing unit 6b for storing register values. The logger unit 6 is configured to store log data obtained during testing in association with the base station simulated device 10 and the fading simulator 70, and to transmit the log data to the setting unit 71 in accordance with a control signal output from the setting unit 71 when a tester operates the operation unit 21. The setting unit 71 is configured to display the log on the display unit 23. Namely, the base station simulated device 10 supplies the logger unit 6 with the communication content between itself and the mobile communication terminal 5 during testing, as log data corresponding to time information. This data may be output from the mobile communication terminal 5 to the logger unit 6. The communication content contains error information.

The log data stored in the logger unit 6 contains time information, test condition information corresponding to the time information, and the error information. The test condition information includes data indicating the register values of the nine shift registers 61 to 69. Therefore, when an error has occurred during testing, the tester can confirm the error, referring to the display content of the display unit 23, and can grasp the register values set in the nine shift registers 61 to 69 when the error has occurred.

Figure 7:
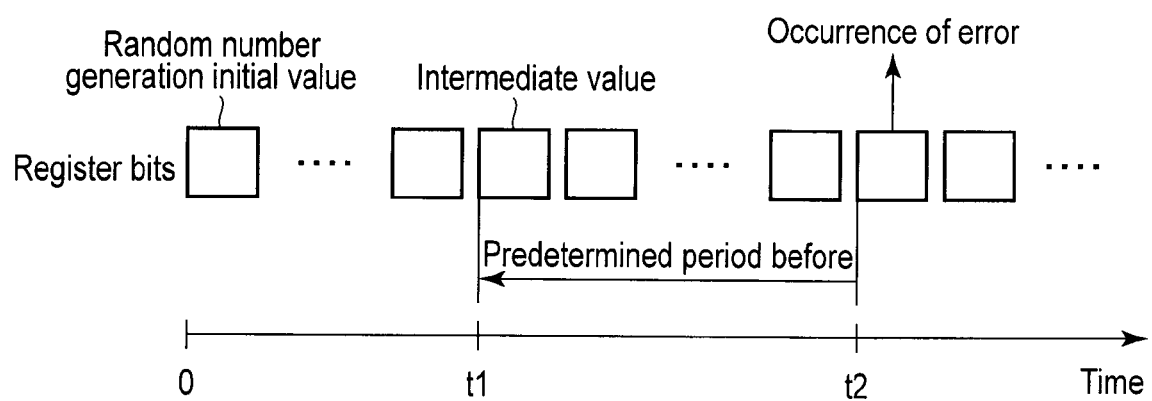
FIG. 7 is a view for explaining an intermediate value employed in the fading simulator of the second embodiment.

Referring then to FIG. 7, the intermediate values of random numbers used for a re-simulation test will be described. As shown in FIG. 7, a random number generation initial value is set as the register values of the shift registers 61 to 69 at the start of the test (time=0). The boxes shown in FIG. 7 represent nine bits set in the shift registers 61 to 69.

Assume here that an error has occurred in register values set in time point t2 as shown in FIG. 7. In this example, if the tester operates the operation unit 21 to perform a re-simulation test, the register value setting unit 71a sets, in the uniform random number generation unit 60, the register values (hereinafter referred to as "an intermediate value") set at time point t1 that is a certain time (e.g., one minute) earlier than the time point t2. Further, the base station simulated device 10 simulates communication performed at and after the time point t1, referring to the log data at the time point t1. Thus, the fading simulator 70 realizes a re-simulation test, which contributes to detection of the cause of the error.

Referring now to the flowchart of FIG. 8, the operation of the fading simulator 70 of the second embodiment will be described. In FIG. 8, steps similar to those of the first embodiment shown in FIG. 4 are denoted by same reference numbers, and no detailed description will be given thereof.

As shown in FIG. 8, the fading simulator 70 of the second embodiment differs from the simulator of the first embodiment only in that the former performs a different operation from the latter when the initial value setting unit 22a has determined in step S12 that there is a request for a re-simulation test.

More specifically, in step S12, the initial value setting unit 22a reads an intermediate value from the log data stored in the logger unit 6 and sets the value in the uniform random number generation unit 60, if it is determined that there is a request for a re-simulation test (step S25).

As described above, in the fading simulator 70 of the second embodiment, since the register value setting unit 71a sets an intermediate value, the reproducibility of the mobile communication terminal test can be enhanced even when fading simulation is repeated under the same fading conditions.

Third Embodiment

Firstly, a description will be given of the configuration of a mobile communication terminal testing system 3 according to a third embodiment of the invention. In the third embodiment, elements similar to those of the mobile communication terminal testing system of the first embodiment are denoted by corresponding reference numbers, and no detailed description will be given thereof.

As shown in FIG. 9, the mobile communication terminal testing system 3 of the third embodiment comprises a base station simulated device 80, and a fading simulator 90. The base station simulated device 80 comprises a digital BBIF 81 and a control unit 82. The digital BBIF 81 comprises a packet generation unit 81a.

Figure 10:
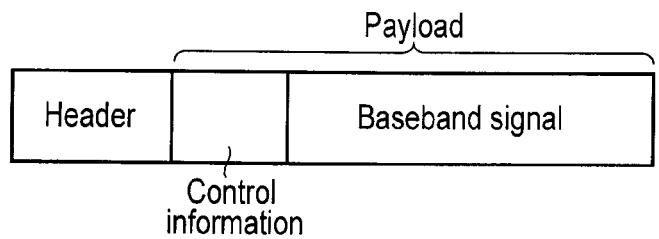
FIG. 10 shows a view for explaining a packet generated by a packet generation unit incorporated in the mobile communication terminal testing system of the third embodiment.

The packet generation unit 81a is configured to be synchronized with a clock signal used in the base station simulated device 80, thereby generating a packet containing the baseband signal generated by the test signal generation unit 11. As shown in FIG. 10, the packet generated by the packet generation unit 81a comprises a header including serial number information, and a payload including predetermined control information and a baseband signal. The control information is used to control the timing of adding a radio wave scattering effect to a test signal, and is generated by the control unit 82. The control information may include a fading start instruction signal for instructing start of fading, or a fading end instruction signal for instructing end of fading. The control signal may be included in the header of the packet.

Figure 11:
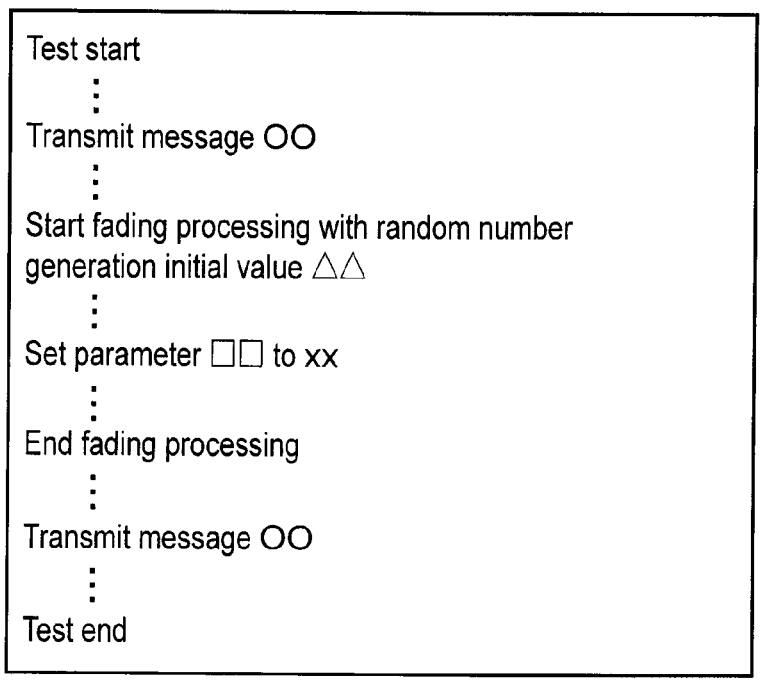
FIG. 11 shows an example of a test scenario employed in the mobile communication terminal testing system of the third embodiment.

The control unit 82 is configured to generate the above control information based on a test scenario that writes a test procedure for testing the mobile communication terminal 5, and to output the control information to the packet generation unit 81a. The test scenario is beforehand stored in a memory (not shown). FIG. 11 shows an example of the test scenario.

The test scenario shown in FIG. 11 comprises various commands, such as a command for starting fading processing using a predetermined random number generation initial value, and a command for ending fading processing. When the control unit 82 has read a command for starting fading processing from the test scenario, it supplies the packet generation unit 81a with control information that includes a fading start instruction signal and a random number generation initial value. In contrast, when the control unit 82 has read a command for ending fading processing from the test scenario, it supplies the packet generation unit 81a with control information that includes a fading end instruction signal.

The fading simulator 90 comprises a setting unit 91, a packet receiving unit 92, a route switching unit 93, a loopback unit 94 and a packet transmission unit 95. The setting unit 91 includes a switch mode setting unit 91a.

The switch mode setting unit 91a is configured to operate when the tester operates the operation unit 21, and to switch the processing mode between an automatic processing mode for automatically performing fading processing based on the control information included in a packet from the base station simulated device 80, and a manual processing mode for manually performing fading processing based on an instruction signal supplied by the tester irrespective of the control information.

The packet receiving unit 92 is configured to receive a packet from the base station simulated device 80, then analyze it, and separate and extract control information and a baseband signal as a test signal, which are contained in the packet. When a fading start instruction signal or a fading end instruction signal is extracted from the control information, the packet receiving unit 92 is configured to supply a notifying signal indicating the extraction of the fading start or fading end instruction signal to the setting unit 91 and the route switching unit 93. When the fading start instruction signal is extracted, the packet receiving unit 92 is configured to also supply the setting unit 91 with data indicating a random number generation initial value, which is contained in the control information along with the fading start instruction signal. The data indicating the random number generation initial value is stored in the initial value storing unit 24 by the setting unit 91. The packet receiving unit 92 corresponds to packet receiving means.

The route switching unit 93 is configured to connect the loopback unit 94 between the output of the packet receiving unit 92 and the packet transmission unit 95 until the fading simulator 90 receives the fading start instruction signal after it starts to operate, and to connect the fading calculation unit 30 between the output of the packet receiving unit 92 and the packet transmission unit 95 after the fading simulator 90 receives the fading start instruction signal. The route setting unit 93 corresponds to route setting means.

The loopback unit 94 is configured to perform, for a predetermined period (latency), delay processing on a baseband signal received from the packet receiving unit 92. The predetermined period is the time period required for the fading calculation unit 30 to process the baseband signal supplied from the packet receiving unit 92. The route including the loopback unit 94 is the route where no fading processing is performed.

The packet transmission unit 95 is configured to receive the baseband signal already subjected to fading processing in the fading calculation unit 30, or the baseband signal already subjected to delay processing in the loopback unit 94, thereby converting it into a packet and transmitting the packet to the base station simulated device 80. The packet transmission unit 95 corresponds to packet transmission means.

Figure 12:
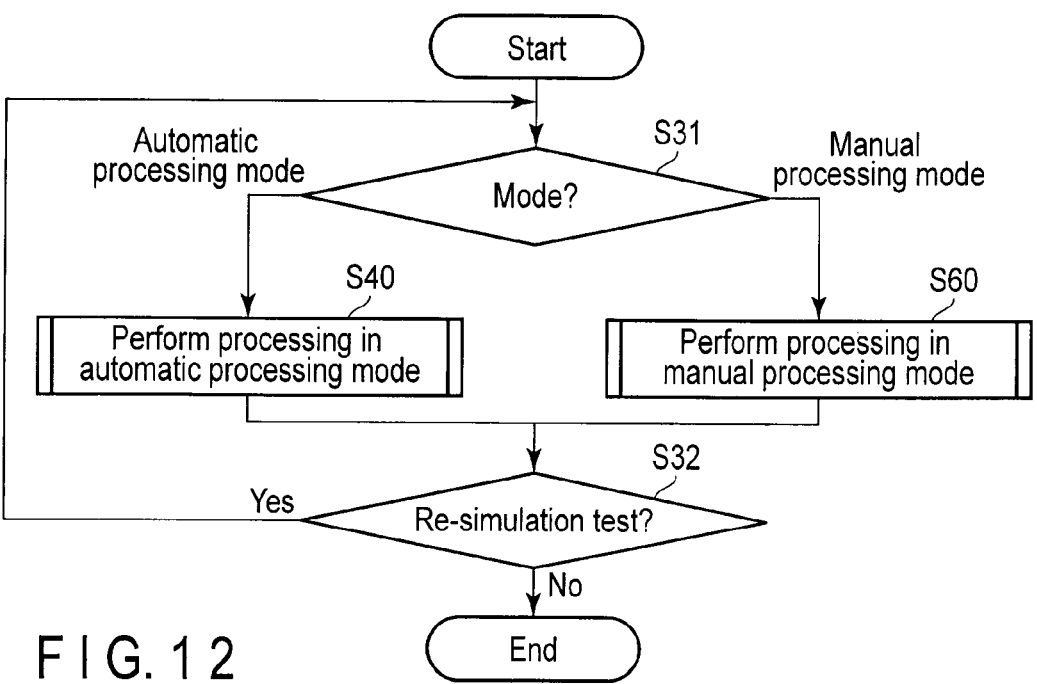
FIG. 12 is a flowchart for explaining a process in a fading simulator that is incorporated in the mobile communication terminal testing system of the third embodiment.

Referring then to the flowchart of FIG. 12, the operation of the fading simulator 90 of the third embodiment will be described.

The switch mode setting unit 91a determines whether the automatic processing mode or the manual processing mode has been instructed through the operation unit 21 (step S31).

If the switch mode setting unit 91a determines in step S31 that the automatic processing mode has been instructed, the fading simulator 90 performs processing in the automatic processing mode (step S40).

In contrast, if the switch mode setting unit 91a determines in step S31 that the manual processing mode has been instructed, the fading simulator 90 performs manual mode processing (step S60).

The setting unit 91 determines whether there is a request for a re-simulation test (step S32). If the setting unit 91 determines that there is a request for a re-simulation test, it reads a random number generation initial value from the initial value storing unit 24, and sets the value in the uniform random number generation unit 60, whereby the program returns to step S31.

In step S32, if the setting unit 91 determines that there is no request for a re-simulation test, the processing is finished.

Figure 13:
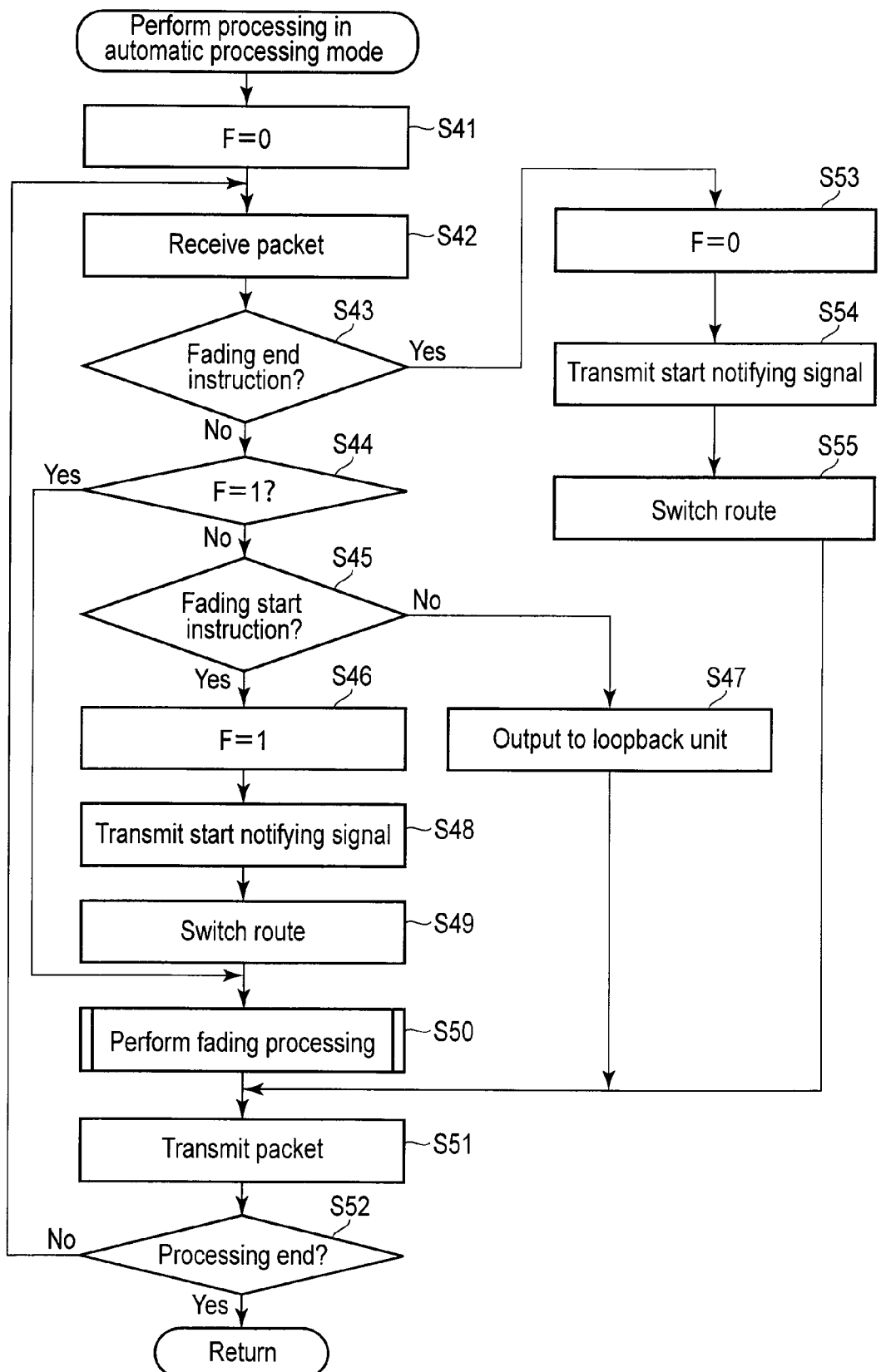
FIG. 13 is a flowchart for explaining a process in automatic processing mode performed in the fading simulator of the third embodiment.

Referring then to FIG. 13, processing in the automatic processing mode will be described. In the initial state, it is assumed that the route switching unit 93 has selected the loopback unit 94.

The controller (not shown) of the fading simulator 90 initializes variable F (F=0) (step S41). The variable F indicates whether fading processing has been started. Namely, variable F=0 indicates that fading processing is not yet started, while variable F=1 indicates that fading processing has been started.

The packet receiving unit 92 receives a packet from the base station simulated device 80 (step S42).

The packet receiving unit 92 analyzes the packet from the base station simulated device 80 to determine whether control information in the header of the packet contains a fading end instruction signal (step S43). If the packet receiving unit 92 determines in step S43 that the control information in the header contains a fading end instruction signal, the program proceeds to step S53, described later.

In contrast, if the packet receiving unit 92 determines in step S43 that the control information in the header contains no fading end instruction signal, the controller of the fading simulator 90 determines whether variable F=1 (step S44).

If the controller of the fading simulator 90 determines in step S44 that variable F=1, the program proceeds to step S50 described later, while if it does not determine that variable F=1, the packet receiving unit 92 determines whether the control information in the header contains a fading start instruction signal (step S45).

If the packet receiving unit 92 determines in step S45 that the control information in the header contains a fading start instruction signal, variable F is set to 1 (step S46), while if it determines that the control information in the header contains no fading start instruction signal, the baseband signal contained in the packet is output to the loopback unit 94 (step S47). Further, if the packet receiving unit 92 determines that the control information contains a fading start instruction signal, the random number generation initial value contained in the control information along with the fading start instruction signal is output to the setting unit 91, and is stored in the initial value storing unit 24 by the setting unit 91.

The packet receiving unit 92 supplies the setting unit 91 and the route switching unit 93 with a start notifying signal indicating that the fading start instruction signal has been acquired (step S48).

The route switching unit 93 switches routes (step S49). Namely, the route switching unit 93 switches the route between the packet receiving unit 92 and the packet transmission unit 95, from the route through the loopback unit 94 to the route through the fading calculation unit 30.

The fading calculation unit 30 performs fading processing (step S50). The fading processing includes steps ranging from step S13 or S14 to step S21 shown in FIG. 4.

The packet transmission unit 95 converts the input baseband signal into a packet and transmits it to the digital BBIF 81 (step S51). The digital BBIF 81 extracts the baseband signal from the payload of the received packet, and outputs the signal to the transmission unit 12.

The controller of the fading simulator 90 determines whether processing in the automatic processing mode should be finished (step S52). If it is determined that processing in the automatic processing mode should be finished, the program returns to the main routine shown in FIG. 12, while if it is not determined that processing in the automatic processing mode should be finished, the program returns to step S42.

In step S53, the controller of the fading simulator 90 sets variable F to 0, and the packet receiving unit 92 outputs a start notifying signal to the setting unit 91 and the route switching unit 93 (step S54). After that, the route switching unit 93 switches the route (step S55), and the program proceeds to step S51. Namely, the route switching unit 93 switches the route between the packet receiving unit 92 and the packet transmission unit 95, from the route through the fading calculation unit 30 to the route through the loopback unit 94.

Figure 14:
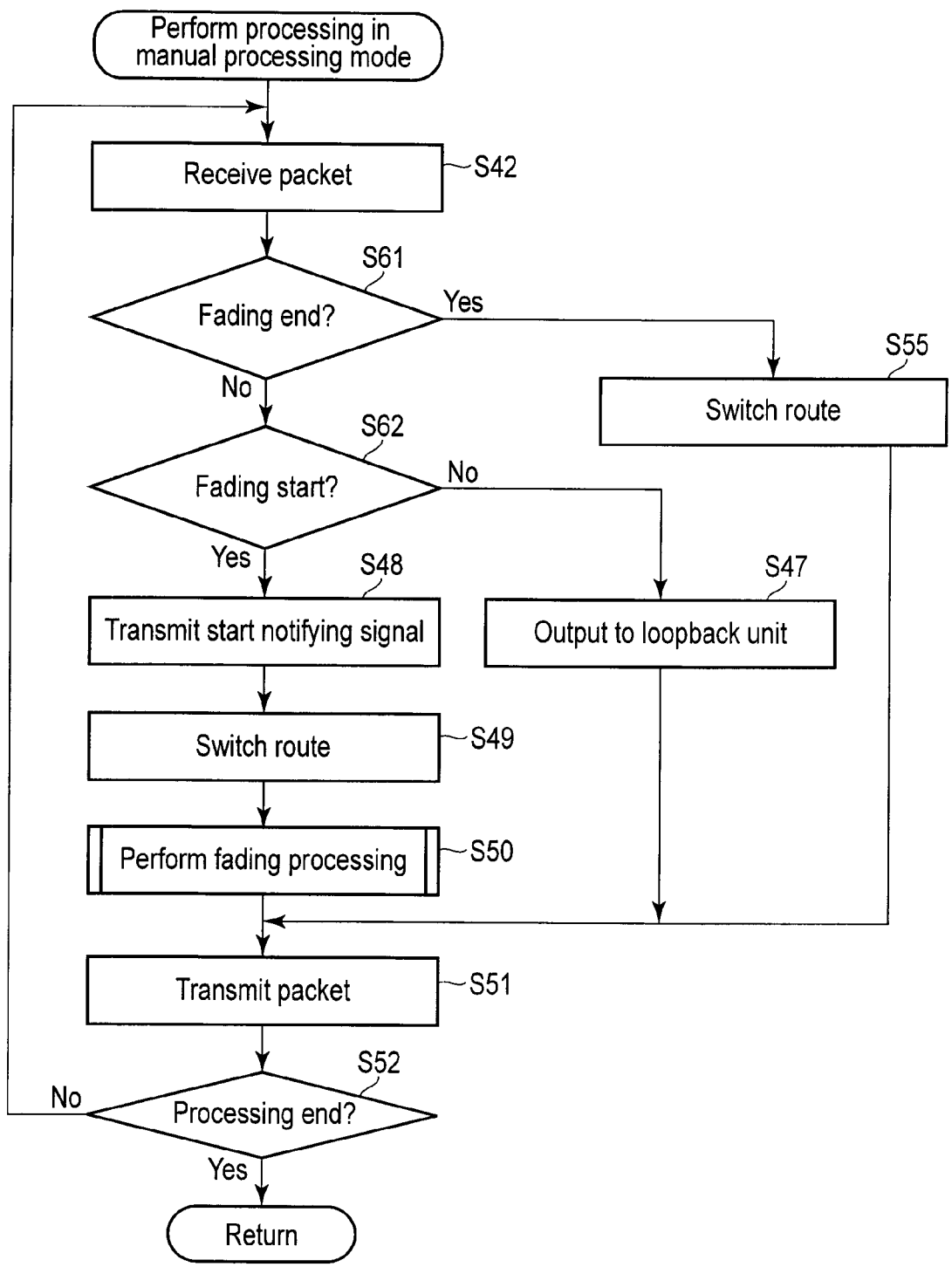
FIG. 14 is a flowchart for explaining a manual processing mode processing in the fading simulator of the third embodiment.

Referring now to FIG. 14, processing in the manual processing mode will be described. In FIG. 14, steps similar to those shown in FIG. 13 are denoted by corresponding reference numbers, and no detailed description will be given thereof. It is assumed that the route switching unit 93 has selected the loopback unit 94 in the initial state.

After receiving a packet in step S42, the packet receiving unit 92 determines whether a fading end instruction signal has been output from the setting unit 91 (step S61). If it determines that no fading end instruction signal has been output from the setting unit 91, it is determined whether a fading start instruction signal has been output from the setting unit 91 (step S62). The signal for instructing start of fading or that for instructing end of fading is output from the setting unit 91 to the packet receiving unit 92 in accordance with tester's operation of the operation unit 21.

If the packet receiving unit 92 determines in step S61 that the signal for instructing end of fading has been output from the setting unit 91, the route switching unit 93 switches the route (step S55), and the program proceeds to step S51.

If the packet receiving unit 92 determines in step S62 that the signal for instructing start of fading has been output from the setting unit 91, it outputs a start notifying signal to the setting unit 91 and the route switching unit 93 (step S48), while if it does not determine that the signal for instructing start of fading has been output from the setting unit 91, the baseband signal contained in the received packet is output to the loopback unit 94 (step S47).

As described above, the fading simulator 90 of the third embodiment can impart a radio wave scattering effect to a test signal even during packet transmission, based on control information for controlling the timing of addition of the effect to the test signal.

Fourth Embodiment

Firstly, the configuration of a mobile communication terminal testing system according to a fourth embodiment of the invention will be described. In the fourth embodiment, elements similar to those of the mobile communication terminal testing system of the first embodiment are denoted by corresponding reference numbers, and no detailed description will be given thereof.

As shown in FIG. 15, a fading simulator 100 according to the fourth embodiment comprises a setting unit 101 and an AWGN signal generator 110. The fading simulator 100 is connected to a logger unit 6. The logger unit 6 comprises an error information storing unit 6a for storing error information, and a waveform data storing unit 6c for storing waveform data.

The setting unit 101 is configured to supply the AWGN signal generator 110 with an instruction signal for wave forming or a re-simulation test. The setting unit 101 constitutes simulation experiment instruction means according to the invention.

The AWGN signal generator 110 comprises a wave generation unit 111, wave memories 112 to 114 and a waveform synthesis unit 115. The AWGN signal generator 110 constitutes a noise generation unit according to the invention.

The waveform generation unit 111 is formed of, for example, a PN code generation unit, and is configured to generate three types of short-period waveforms using normal random numbers. These three types of waveforms have different time lengths (periods) that are relatively prime numbers. The waveform generation unit 111 constitutes waveform data generation means according to the invention. The waveforms generated by the waveform generation unit 111 are not limited to three. It is sufficient if a plurality of waveforms are generated.

The waveform memories 112 to 114 may be formed of, for example, random access memories (RAMs), and are configured to store data corresponding to the three types of waveforms generated by the waveform generation unit 111. More specifically, the waveform memory 112 increments, in a time-series order, an address assigned to each sample data item of the waveform data, and stores the same. The waveform synthesis unit 115 reads each sample data item from the waveform memory 112, while incrementing the address. After the last sample data item of the waveform data is read from the waveform memory 112, the waveform synthesis unit 115 returns to the first address assigned to the leading sample data item of the waveform data, thereby iterating sample data reading. Similarly, the waveform memories 113 and 114 store waveform data, from which sample data is read. As described above, the waveform data stored in the waveform memories 112 to 114 are iteratively read by the waveform synthesis unit 115.

The waveform synthesis unit 115 is configured to add the three types of short-period waveform data stored in the waveform memories 112 to 114, to thereby generate one long-period waveform data item. The thus-generated waveform data is output to the logger unit 6 and the band limit filter 52. The waveform synthesis unit 115 is also configured to read waveform data from the logger unit 6 and output it to the band limit filter 52 when a re-simulation test is performed. The waveform synthesis unit 115 constitutes waveform data synthesis means according to the invention. Namely, if a plurality of waveforms having periods that are relatively prime numbers are added, the periods of the resultant waveform correspond to the product of the periods of the original waveforms. Specifically, assuming that the periods of the three waveforms are T1, T2 and T3, the periods of the added waveform is T1×T2×T3. By virtue of this structure, a long-period waveform can be obtained, compared to the memory capacities of the waveform memories 112 to 114.

FIG. 16 schematically shows waveform data stored in the logger unit 6. As shown in FIG. 16, waveform data is stored in the logger unit 6 from the start of a test. Assume here that an error has occurred at a time point t2 as shown. In this case, assume that a tester operates the operation unit 21 to perform a re-simulation test from a time point t1 earlier by one minute than the time point t2. Further, the base station simulated device 10 simulates communication that starts at the time point t1, referring to the log data at the time point t1. As a result, the fading simulator 100 can perform a re-simulation test to detect the cause of the error.

Referring mainly to the flowchart of FIG. 17, the operation of the fading simulator 100 will be described. In FIG. 17, steps similar to those of the flowchart (see FIG. 4) of the first embodiment are denoted by corresponding reference numbers, and no description will be given thereof.

If the setting unit 101 determines in step S12 that there is a request for a re-simulation test, it causes the waveform synthesis unit 115 to read data at the time point t1 et seq. from the logger unit 6 (step S71).

In contrast, if the setting unit 101 determines in step S12 that there is no request for a re-simulation test, it causes the waveform generation unit 111 to generate new waveform data (step S72).

The waveform synthesis unit 115 supplies the band limit filter 52 with the read waveform data or the newly generated waveform data as an AWGN signal (step S73).

As described above, the fading simulator 100 of the fourth embodiment can perform a re-simulation test based on waveform data with a longer-period noise signal, by generating and synthesizing a plurality of waveform data.

(Modification)

In the embodiments, the waveform synthesis unit 115 may store, instead of the waveform data, readout addresses corresponding to the waveform memories 112 to 114 in the waveform data storing unit 6c of the logger unit 6, and report the address at the time point t1 to the waveform synthesis unit 115 during a re-simulation test. Namely, when waveform data is directly stored in the waveform data storing unit 6c, the waveform synthesis unit 115 can output data only within the time zone in which the waveform data is stored in the logger unit 6, and hence re-simulation test is limited to this time zone. In contrast, in the structure in which addresses are stored, and the address at the time point t1, at which the re-simulation test is started, is reported to the waveform synthesis unit 115, the waveform synthesis unit 115 can endlessly continue readout of waveform data from the waveform memories 112 to 114, and hence there is no limit in the time range of the re-simulation test.

As described above, the fading simulators and the fading simulation methods of the embodiments can enhance the reproducibility of a mobile communication terminal test even when fading simulation is repeated under the same fading conditions, and are therefore very useful in simulating the radio wave propagation environment of a mobile communication terminal, such as a cellular phone.

The various modules of the systems described herein can be implemented as software applications, hardware and/or software modules, or components on one or more computers, such as servers. While the various modules are illustrated separately, they may share some or all of the same underlying logic or code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fading simulator including a noise generation unit that generates an additive white Gaussian noise signal, and configured to receive a test signal to be input to a mobile communication terminal as a test target, and to add, to the test signal, a radio wave scattering effect, using the additive white Gaussian noise signal, comprising:

a setting module configured to cause the noise generation unit to generate an additive white Gaussian noise signal of a predetermined level, when a first test is performed on the mobile communication terminal, the setting module also setting for causing the noise generation unit to generate the same additive white Gaussian noise signal as the additive white Gaussian noise signal in the first test, when a second test that re-simulates the first test is performed after the first test;

a uniform random number generation module configured to sequentially generate uniform random numbers, the uniform random numbers being determined uniquely in accordance with clock signals when predetermined data is set; and a normal random number transform module configured to transform, into normal random numbers, the uniform random numbers generated by the uniform random number generation means;

the setting module having:

a data setting module configured to set the predetermined data in the uniform random number generation module, the data setting module setting the predetermined data, set in the first test, in the uniform random number generation module when the second test is performed.

2. The fading simulator of claim 1, wherein the uniform random number generation module is a pseudo noise code generation unit including a plurality of shift registers, and generates each of the uniform random numbers by changing register values in the shift registers in accordance with a corresponding one of the clock signals.

3. The fading simulator of claim 2, wherein
a log of the register values is made in the first test;
the second test is performed to re-simulate an operation after a second time point that is a predetermined time period before a first time point at which an error occurred at the mobile communication terminal during execution of the first test; and
the setting module further comprises a register value setting module configured to set the register values based on a log at the second time point when the second test is performed.

4. The fading simulator of claim 1, further comprising:
a packet receiving module connected to a base station simulated device and configured to simulate an operation of a base station to transmit the test signal to the mobile communication terminal, the packet receiving module receiving, from the base station simulated device, a packet containing the test signal to be input to the mobile communication terminal, and control information used to control timing of adding the radio wave scattering effect to the test signal;
a route switching module configured to perform switching between a route for adding the radio wave scattering effect to the test signal, and a route for not adding radio wave scattering effect to the test signal; and
a packet transmission module configured to transmit, to the base station simulated device, a packet containing one of a test signal with the radio wave scattering effect and a test signal without the radio wave scattering effect.

5. The fading simulator of claim 1, further comprising:
a waveform data generation module configured to generate a plurality of waveform data that differ from each other in period; and
a waveform data synthesis module configured to synthesize the waveform data and output synthesized waveform data as the additive white Gaussian noise signal, wherein
a log of the waveform data output from the waveform data synthesis module is made;
the waveform data synthesis module is permitted to read the log and output the additive white Gaussian noise signal based on the log; and
the setting module performs setting for outputting the additive white Gaussian noise signal based on the log, made in the first test, when the second test is performed.

6. The fading simulator of claim 5, wherein
the second test is performed to re-simulate an operation after a second time point that is a predetermined time period before a first time point at which an error occurred at the mobile communication terminal during execution of the first test; and
the setting module performs setting for outputting the additive white Gaussian noise signal based on a log made after the second time point, when the second test is performed.

7. A fading simulation method indulging noise generation step of generating an additive white Gaussian noise signal, and step of receiving a test signal to be input to a mobile communication terminal a test target, and of adding, to the test signal, a radio wave scattering effect, using the additive white Gaussian noise signal, comprising:

first setting step of performing setting for generating an additive white Gaussian noise signal of a predetermined level in the noise generation step, when a first test is performed on the mobile communication terminal; and
second setting step of performing setting for generating the sane additive white Gaussian noise signal as the additive white Gaussian noise signal in the first test, when a second test that re-simulates the first test is performed after the first test is performed;
wherein the noise generation step comprises:
uniform random number generation step of sequentially generating uniform random numbers, the uniform random numbers being determined uniquely in accordance with clock signals when predetermined data is set; and
normal random number transform step of transforming, into normal random numbers, the uniform random numbers generated in the uniform random number generation step,
the first setting step setting the predetermined data,
the second setting step setting the predetermined data set in the first test, when the second test is performed.

8. The fading simulation method of claim 7, wherein the uniform random number generation step is executed using a plurality of shift registers, and each of the uniform random numbers is generated by changing register values in the shift registers in accordance with a corresponding one of the clock signals.

9. The fading simulation method of claim 8, further comprising log making step of making a log of the register values in the first test,
wherein
the second test is performed to re-simulate an operation after a second time point that is a predetermined time period before a first time point at which an error occurred at the mobile communication terminal during execution of the first test; and
the second setting step includes step of setting the register values based on a log at the second time point when the second test is performed.

10. The fading simulation method of claim 7, further comprising:
packet receiving step of receiving, from a base station simulated device, a packet containing the test signal to be input to the mobile communication terminal, and control information used to control timing of adding the radio wave scattering effect to the test signal, the base station simulated device simulating an operation of a base station to transmit the test signal to the mobile communication terminal;
route switching step of performing switching between a route for adding the radio wave scattering effect to the test signal, and a route for not adding radio wave scattering effect to the test signal; and
packet transmission step of transmitting, to the base station simulated device, a packet containing one of a test signal with the radio wave scattering effect and a test signal without the radio wave scattering effect.

11. The fading simulation method of claim 7, wherein
the noise generation step comprises:
waveform generation step of generating a plurality of waveform data that differ from each other in period;
waveform data synthesis step of synthesizing the waveform data and outputting synthesized waveform data as the additive white Gaussian noise signal; and
log making step of making a log of the waveform data output in the waveform data synthesis step, the second setting step includes step of setting for outputting the additive white Gaussian noise signal based on the log, made in the first test, when the second test is performed.

12. The fading simulation method of claim 11, wherein the second test is performed to re-simulate an operation after a second time point that is a predetermined time period before a first time point at which an error occurred at the mobile communication terminal during execution of the first test; and
the second setting step includes step of setting for outputting the additive white Gaussian noise signal based on a log made after the second time point, when the second test is performed.

\* \* \* \* \*